(12) United States Patent
Hsieh et al.

(10) Patent No.: US 9,845,716 B2
(45) Date of Patent: Dec. 19, 2017

(54) TECHNIQUES FOR CONTROL OF AN SCR AFTERTREATMENT SYSTEM

(71) Applicant: Cummins Inc., Columbus, IN (US)

(72) Inventors: Ming-Feng Hsieh, Nashville, IN (US); Michael Haas, Columbus, IN (US); Phanindra V. Garimella, Bloomington, IN (US)

(73) Assignee: Cummins Inc., Columbus, IN (US)

( * ) Notice: Subject to any disclaimer, the term of this patent is extended or adjusted under 35 U.S.C. 154(b) by 964 days.

(21) Appl. No.: 14/179,887

(22) Filed: Feb. 13, 2014

(65) Prior Publication Data
US 2015/0226102 A1 Aug. 13, 2015

(51) Int. Cl.
- *F01N 3/00* (2006.01)
- *F01N 3/20* (2006.01)
- *F01N 3/10* (2006.01)
- *F01N 11/00* (2006.01)
- *B01D 53/94* (2006.01)

(52) U.S. Cl.
CPC ......... *F01N 3/208* (2013.01); *B01D 53/9418* (2013.01); *B01D 53/9495* (2013.01); *F01N 3/106* (2013.01); *F01N 11/00* (2013.01); *B01D 2251/2062* (2013.01); *F01N 2560/026* (2013.01); *F01N 2560/14* (2013.01); *F01N 2610/02* (2013.01); *F01N 2610/146* (2013.01); *Y02T 10/24* (2013.01); *Y02T 10/47* (2013.01)

(58) Field of Classification Search
CPC .......... F01N 3/208; F01N 3/106; F01N 11/00; F01N 2560/026; F01N 2560/14; F01N 2610/02; F01N 2610/146; B01D 53/9418; B01D 53/9495; B01D 2251/2062; Y02T 10/24; Y02T 10/47

USPC .......... 60/274, 295, 297, 299, 300, 301, 303
See application file for complete search history.

(56) References Cited

U.S. PATENT DOCUMENTS

| 4,963,332 A | 10/1990 | Brand et al. |
| 5,785,937 A | 7/1998 | Neufert |

(Continued)

FOREIGN PATENT DOCUMENTS

| WO | 2012047484 | 4/2012 |
| WO | 2012129179 | 9/2012 |
| WO | 2013147653 A1 | 10/2013 |

OTHER PUBLICATIONS

International Searching Authority, International Search Report & Written Opinion issued in corresponding International Application No. PCT/US2015/015605, dated May 15, 2015, 9 pp.

*Primary Examiner* — Jason Shanske
*Assistant Examiner* — Kelsey Stanek
(74) *Attorney, Agent, or Firm* — Taft Stettinius & Hollister LLP

(57) ABSTRACT

A selective catalytic reduction (SCR) catalyst is disposed in an exhaust gas system of an internal combustion engine. A reductant injector is coupled to the exhaust gas stream at a position upstream of the SCR catalyst, and first and second $NO_x$ sensors provide NOx measurements upstream of and downstream of the SCR catalyst, respectively. A system and method is disclosed for operating the system to determine a NOx amount and/or a NH3 slip amount downstream of the SCR catalyst by decoupling NOx-NH3 measurements from the output of the second NOx sensor to provide control of the reductant injection amount.

15 Claims, 3 Drawing Sheets

(56) References Cited

U.S. PATENT DOCUMENTS

| | | | |
|---|---|---|---|
| 6,427,439 | B1 | 8/2002 | Xu et al. |
| 6,871,490 | B2 | 3/2005 | Liang |
| 7,093,427 | B2 | 8/2006 | van Nieuwstadt et al. |
| 7,150,145 | B2 | 12/2006 | Patchett et al. |
| 7,255,098 | B1 | 8/2007 | Boley |
| 7,263,823 | B2 | 9/2007 | Andrews |
| 7,886,527 | B2 | 2/2011 | Solbrig |
| 8,061,126 | B2 | 11/2011 | Gady et al. |
| 8,156,728 | B2 | 4/2012 | Hinz |
| 8,161,730 | B2 | 4/2012 | Chi et al. |
| 8,176,730 | B2 | 5/2012 | Shimomura et al. |
| 8,201,394 | B2 | 6/2012 | Chi |
| 8,225,595 | B2 | 7/2012 | Garimella et al. |
| 8,240,136 | B2 | 8/2012 | Kurtz et al. |
| 8,256,208 | B2 | 9/2012 | Wills et al. |
| 8,281,572 | B2 | 10/2012 | Chi et al. |
| 8,387,368 | B2 | 3/2013 | Parmentier et al. |
| 8,607,625 | B2 | 12/2013 | Kowalkowski et al. |
| 2005/0282285 | A1 | 12/2005 | Radhamohan et al. |
| 2010/0242440 | A1* | 9/2010 | Garimella .......... B01D 53/9409 60/276 |
| 2011/0185707 | A1* | 8/2011 | Upadhyay ................. F01N 3/18 60/274 |
| 2012/0017568 | A1 | 1/2012 | Geveci |
| 2012/0060469 | A1 | 3/2012 | Gady et al. |
| 2012/0073265 | A1 | 3/2012 | Yeager et al. |
| 2012/0137657 | A1 | 6/2012 | Dahl et al. |
| 2012/0260625 | A1* | 10/2012 | Feldmann ............. F01N 3/2066 60/273 |
| 2013/0202506 | A1 | 8/2013 | Pfister et al. |

* cited by examiner

TECHNIQUES FOR CONTROL OF AN SCR AFTERTREATMENT SYSTEM

BACKGROUND

The technical field of the present disclosure generally relates to control of selective catalytic reduction (SCR) aftertreatment systems for internal combustion engines.

SCR systems present several control challenges for internal combustion engine applications, including for mobile applications. SCR systems include a reduction catalyst and a reductant, such as urea or ammonia. An injector provides the reductant to the exhaust stream at a position upstream of the reduction catalyst, and the reductant enters the gas phase of the exhaust stream as ammonia. A delay sometimes occurs between the introduction of the reductant and the availability of the reductant product, for example injected particles of the reductant may need to evaporate into the exhaust stream, hydrolyze from urea to ammonia, and/or thoroughly mix into the exhaust stream for general availability across the reduction catalyst. Additionally, the reductant catalyst may include some ammonia storage capacity. Storage capacity can complicate the controls process, for example by creating additional controls targets (e.g. a storage target), by releasing ammonia unexpectedly (e.g. when a system condition causes a decrease in storage capacity), and/or by adsorbing some of the injected ammonia in an early part of the catalyst thereby reducing the availability of ammonia at a rear portion of the catalyst during catalyst filling operating periods.

The challenges presented by presently available SCR systems are exacerbated by the transient nature of mobile applications. The engine load and speed profile varies during operations in a manner that is determined by an operator and generally not known in advance to the SCR control system. Additionally, available feedback control systems suffer from several drawbacks. For example, the concentration of ammonia is difficult to determine in real time. Commercially reasonable NOx sensors can suffer from cross-sensitivity with ammonia, complicating the determination of the amount of NOx present in the exhaust gas outlet from the SCR catalyst. Further, ammonia is generally an undesirable constituent of the final exhaust emissions, and ammonia that is emitted from or "slips" from the catalyst represents ineffectively utilized reductant that increases operating costs. Therefore it is desirable to operate at a very low or zero ammonia concentration at the outlet of SCR catalyst outlet. However, NOx sensors that are cross-sensitive to ammonia hinder the ability to provide a reliable estimate of the amount of ammonia slip, reducing the effectiveness of feedback SCR control in providing an optimal amount of ammonia to the exhaust system and potentially creating false indications of an SCR and/or reductant injector fault conditions. As a result, further contributions in the detection and determination of ammonia slip conditions in SCR control are needed.

SUMMARY

One embodiment is a unique method for controlling an SCR aftertreatment system using a NOx sensor output from a NOx sensor at an outlet of, or downstream of, an SCR catalyst that receives an exhaust gas flow from an internal combustion engine, where the NOx sensor output is decoupled from the potential presence of NH3 in the exhaust gas flow. Other embodiments include unique methods, systems, and apparatus to estimate SCR catalyst efficiency from the NOx sensor outputs upstream and downstream of the SCR catalyst under a NOx perturbation/variation operating condition, to decouple NOx and NH3 amounts from the $NO_x$ sensor output of the NOx sensor downstream of the SCR catalyst, to operate an SCR aftertreatment system in response to the estimate of SCR catalyst efficiency, and/or to determine an NH3 slip amount and NOx amount downstream of the SCR catalyst from a NOx amount upstream of the SCR catalyst, the deNOx efficiency of the SCR catalyst, and an output of the NOx sensor downstream of the SCR catalyst.

This summary is provided to introduce a selection of concepts that are further described below in the illustrative embodiments. This summary is not intended to identify key or essential features of the claimed subject matter, nor is it intended to be used as an aid in limiting the scope of the claimed subject matter. Further embodiments, forms, objects, features, advantages, aspects, and benefits shall become apparent from the following description and drawings.

DESCRIPTION OF ILLUSTRATIVE EMBODIMENTS

Figure 1:
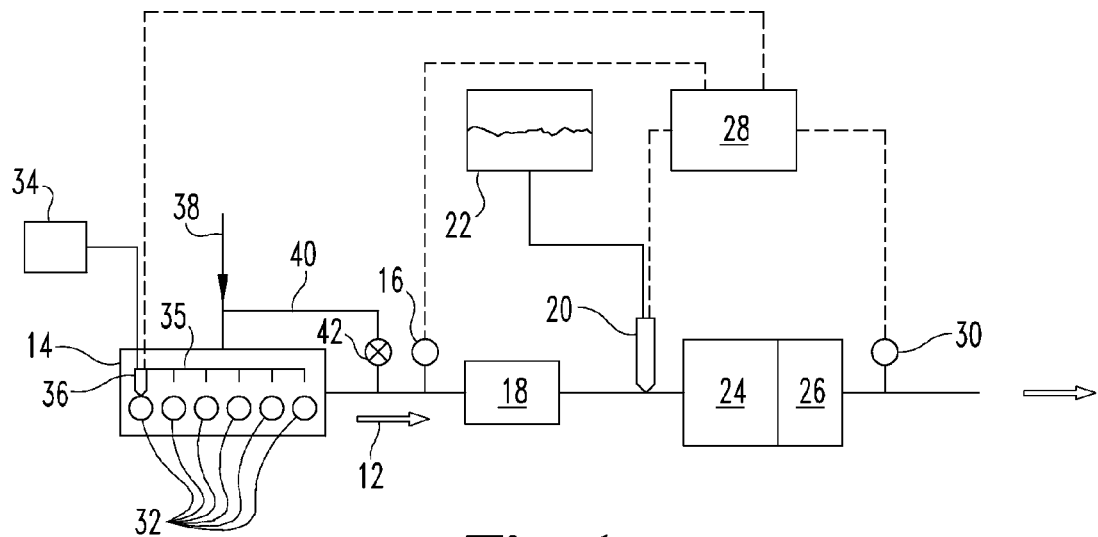
FIG. 1 is a schematic diagram of a system including an SCR catalyst to reduce $NO_x$ emissions in an exhaust gas flow produced by an internal combustion engine.

For the purposes of promoting an understanding of the principles of the invention, reference will now be made to the embodiments illustrated in the drawings and specific language will be used to describe the same. It will nevertheless be understood that no limitation of the scope of the invention is thereby intended, any alterations and further modifications in the illustrated embodiments, and any further applications of the principles of the invention as illustrated therein as would normally occur to one skilled in the art to which the invention relates are contemplated herein.

Referencing FIG. 1, an internal combustion engine system 10 includes an exhaust gas flow 12 produced by operation of an internal combustion engine 14, the exhaust gas flow 12 including an amount of NOR. Engine 14 includes a number of cylinders 32 that receive fueling from a fuel source 34 via an injector 36, only one of which is shown in FIG. 1. Injector 36 may be a direct injector, a port injector, or both. In still other embodiments, fuel is injected in an intake system upstream of cylinders 32. In the illustrated embodiment, a common rail 35 is provided that distributes fuel to all or a portion of cylinders 32.

In the illustrated embodiment, six cylinders 32 are shown in an in-line arrangement. However, any number of cylinders and any cylinder arrangement, such as a V-shaped arrangement, are contemplated. Combustion of the fuel in cylinders 32 produces the exhaust flow 12, a portion of which may be recirculated to an intake system 38 via an exhaust gas recirculation (EGR) conduit 40. EGR conduit 40 can include a control valve 42 and other structures such as an EGR cooler and EGR bypass (not shown).

The system 10 includes a first $NO_x$ sensor 16 to provide an output indicative of a measurement of an engine-out $NO_x$ amount upstream of an SCR catalyst 24. The engine-out NOR amount may alternatively be determined virtually by a model in response to engine and exhaust operating parameters, or a sensor or sensors positioned at a different location in the system 10. As used herein, NOx sensor 16 refers either an actual NOx sensor or a virtual NOx sensor.

The system 10 includes an upstream aftertreatment component 18, that may be an oxidation catalyst, a particulate filter, or both. In certain embodiments, the system 10 does not include any oxidation catalyst and/or particulate filter. The system 10 also includes a reductant injector 20 fluidly coupled to a reductant source 22. The reductant injector 20 injects reductant, such as urea, $NH_3$, or other $NH_3$ producing constituent, into exhaust gas flow 12. The system 10 includes SCR catalyst 24 downstream of reductant injector 20 to receive the injected reductant with the exhaust gas flow, and a second NOx sensor 30 downstream of SCR catalyst 24. In one embodiment, NOx sensor 30 is an actual NOx sensor that is cross-sensitive to ammonia.

The system 10 may include an optional NH3 oxidation (AMOX) catalyst 26, provided to oxidize at least a portion of the slipping NH3 from the SCR catalyst 24 during at least some operating conditions. The AMOX catalyst 26 may be present as a discrete catalytic element, in the same or a different housing from the SCR catalyst 24, and may be included as a washcoat on a portion (specifically a rear portion) of the SCR catalyst 24. The SCR catalyst 24 may include one or more catalyst elements located in the same or a different housing. Additional SCR catalyst elements may be present, and are schematically included with the SCR catalyst 24 herein. In addition, certain embodiments contemplate that the AMOX catalyst 26 can be completely removed from system 10 in view of the systems and techniques disclosed herein to mitigate or eliminate NH3 slip.

The system 10 further includes a controller 28. The controller 28 may form a portion of a processing subsystem, and may include functional elements in software and/or hardware. The controller 28 may be a single device or more than one distributed devices. The controller 28 may have modules structured to functionally execute any operations of any method or procedure described herein. In the illustrated embodiment, controller 28 is connected directly or indirectly to reductant injector to provide a reductant injection amount into the exhaust flowpath. Controller 28 is also connected to NOx sensors 16, 30 to receive sensor output signals or, in the case of a virtual sensor, outputs of one or more signals indicative of, a NOx amount and/or the presence NOx in the exhaust gas flow. Controller 28 is further connected to injector 36 to provide fueling signals in accordance with fueling maps or other fueling command parameters to satisfy a torque request from the operator. Controller 28 may also be connected with control valve 42 to control EGR flow from the exhaust system to intake system 38.

An exemplary method in which controller 28 can be configured for execution of control algorithms includes providing a SCR catalyst disposed in an exhaust gas flow produce by internal combustion engine 14, and a reductant injector 20 operationally coupled to the exhaust gas flow at a position upstream of the SCR catalyst 24. The method includes providing a first $NO_x$ sensor 16 coupled to the exhaust gas flow at a position upstream of the SCR catalyst 24 and a second NOx sensor 30 coupled to the exhaust gas flow downstream of the SCR catalyst 24.

Figure 2:
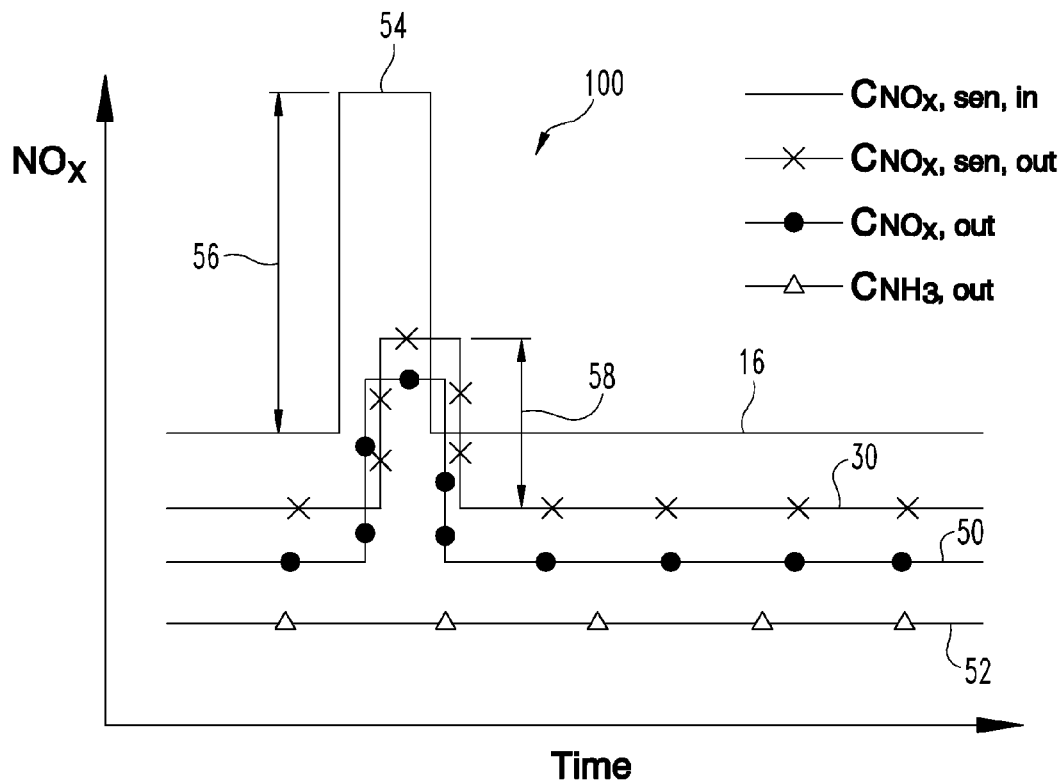
FIG. 2 is a graphical illustration of a procedure for decoupling NH3 and NOx amounts from a NOx sensor output downstream of an SCR catalyst.

The method may further include operating a NOx-NH3 decoupling algorithm to determine a NOx amount and/or an NH3 amount from the output of second NOx sensor 30 when engine 14 is operating to produce an exhaust gas flow to SCR catalyst 24. Referring to FIG. 2, a graphical representation of one embodiment NOx-NH3 decoupling algorithm 100 for determining a NOx amount 50, an NH3 amount 52 and/or NH3 slip condition from outputs of first NOx sensor 16 and second NOx sensor 30 in response to a NOx perturbation/variation condition is shown. In this embodiment, controller 28 is configured to execute algorithm 100 to decouple NOx and NH3 from second NOx sensor 30 by comparing the engine out/SCR inlet NOx sensor amplitude 56 associated with the impulse/variation from first NOx sensor 16 and with the sensor amplitude 58 associated with the impulse/variation from second NOx sensor 30 in response to NOx perturbation/variation event 54 during operation of engine 14. It has been found that the system out/SCR outlet NOx sensor impulse amplitude 56 and the engine out/SCR inlet NOx sensor impulse amplitude 58 can be used to determine instantaneous deNOx efficiency of SCR catalyst 24 due to the slow dynamics of change in the NH3 amount at the SCR outlet.

The NOx impulse amplitude 56, 58 can be generated by controller 28 by perturbing one or more engine actuator(s) which can affect the engine-out NOx concentration, or by driving command variation from the driver (vehicle operator) which may or may not include extra NOx perturbation/variation generated by the controller. A NOx impulse/variation implies value change from a low to high amplitude and/or high to low amplitude, and is not limited to any specific shape of change as long as the range of change of NOx sensor impulse amplitude 56, 58 can be measured within a finite time period.

In one embodiment of the algorithm 100, the output of second NOx sensor 30 can be modeled by the following equation:

$$C_{NOx,Sen,out} = C_{NOx,out} + k \cdot C_{NH3,out} \qquad \text{Equation 1}$$

where $C_{NOx,Sen,out}$ is the SCR outlet NOx sensor output of second NOx sensor 30, $C_{NOx,out}$ is the actual NOx amount at the SCR outlet, k is a cross-sensitivity factor of NOx sensor 30 with ammonia, and $C_{NH3,out}$ actual NH3 amount at the SCR outlet. As used herein, an amount can be a concentration, weight, or other suitable indicator of the NOx and/or NH3 present in the exhaust gas flow 12.

Furthermore, since the engine out NOx sensor 16 is not subjected to the presence of NH3, it can be assumed that the actual engine out NOx amount, and thus the NOx amount at the inlet to SCR catalyst 24, is equal to the NOx amount indicated by the output of NOx sensor 16. Therefore:

$$C_{NOx,in} = C_{NOx,sen,in} \qquad \text{Equation 2}$$

$$\eta_{SCR} = (C_{NOx,in} - C_{NOx,out})/C_{NOx,in} \qquad \text{Equation 3}$$

where $C_{NOx,in}$ is the NOx amount upstream of the inlet of SCR catalyst 24 and $C_{NOx,sen,in}$ is the NOx amount measured by the output of the first NOx sensor 16. In addition, $\eta_{SCR}$ is the efficiency of SCR catalyst 24 in removing NOx. For example, in Equation 3, $\eta_{SCR}$ is 0.9 if SCR catalyst removes 90% of the engine out NOx.

In operation, the ability to reliably determine $C_{NOx,out}$ from second NOx sensor 30 is hindered by the possible presence of NH3 in the exhaust flow. However, since the system out NH3 amount and SCR catalyst efficiency have very slow dynamics in responding to abrupt or rapid changes of the NOx amount output by engine 14, the response of NOx sensor 16 and NOx sensor 30 to a NOx perturbation/variation event 54 is not significantly impacted by any change of $C_{NH3,out}$ or catalyst efficiency $\eta_{SCR}$. Thus, a reliable estimate of the SCR catalyst efficiency $\eta_{SCR}$ in response to a NOx pulse created by a NOx perturbation/variation event can be determined from the following equation:

$$\eta_{SCR} = (C_{NOx,imp,in} - C_{NOx,imp,out})/C_{NOx,imp,in} \quad \text{Equation 4}$$

where $C_{NOx,imp,in}$ is the amplitude of the impulse 56 of NOx sensor 16 measured by NOx sensor 16, and $C_{NOx,imp,out}$ is the amplitude of the impulse 58 of NOx sensor 30 measured by NOx sensor 30.

From Equation 4 and the assumptions discussed above, then:

$$C_{NOx,out} = C_{NOx,in} * (1 - \eta_{SCR}) \quad \text{Equation 5}$$

$$C_{NH3,out} = (C_{NOx,sen,out} - C_{NOx,out})/k \quad \text{Equation 6}$$

Therefore, an estimate of the actual system out NOx amount ($C_{NOx,out}$) can be determined from the output of NOx sensor 16, even under NH3 slip conditions, by determining the efficiency of SCR catalyst 24 from the ratio of the amplitude of the impulses 56, 58 of first and second NOx sensors 16, 30 under NOx perturbation/variation conditions. In addition, having determined the actual system out NOx amount ($C_{NOx,out}$), an estimate of the system out NH3 amount ($C_{NH3,SO}$) can be determined from the output of second NOx sensor 30 ($C_{NOx,sen,out}$), the actual system out NOx amount ($C_{NOx,out}$), and the NH3 cross-sensitivity factor k of NOx sensor 30.

Certain operations described herein include operations to interpret one or more parameters. Interpreting, as utilized herein, includes receiving values by any method known in the art, including at least receiving values from a datalink or network communication, receiving an electronic signal (e.g. a voltage, frequency, current, or PWM signal) indicative of the value, receiving a software parameter indicative of the value, reading the value from a memory location on a computer readable medium, receiving the value as a run-time parameter by any means known in the art, and/or by receiving a value by which the interpreted parameter can be calculated, and/or by referencing a default value that is interpreted to be the parameter value.

Figure 3:
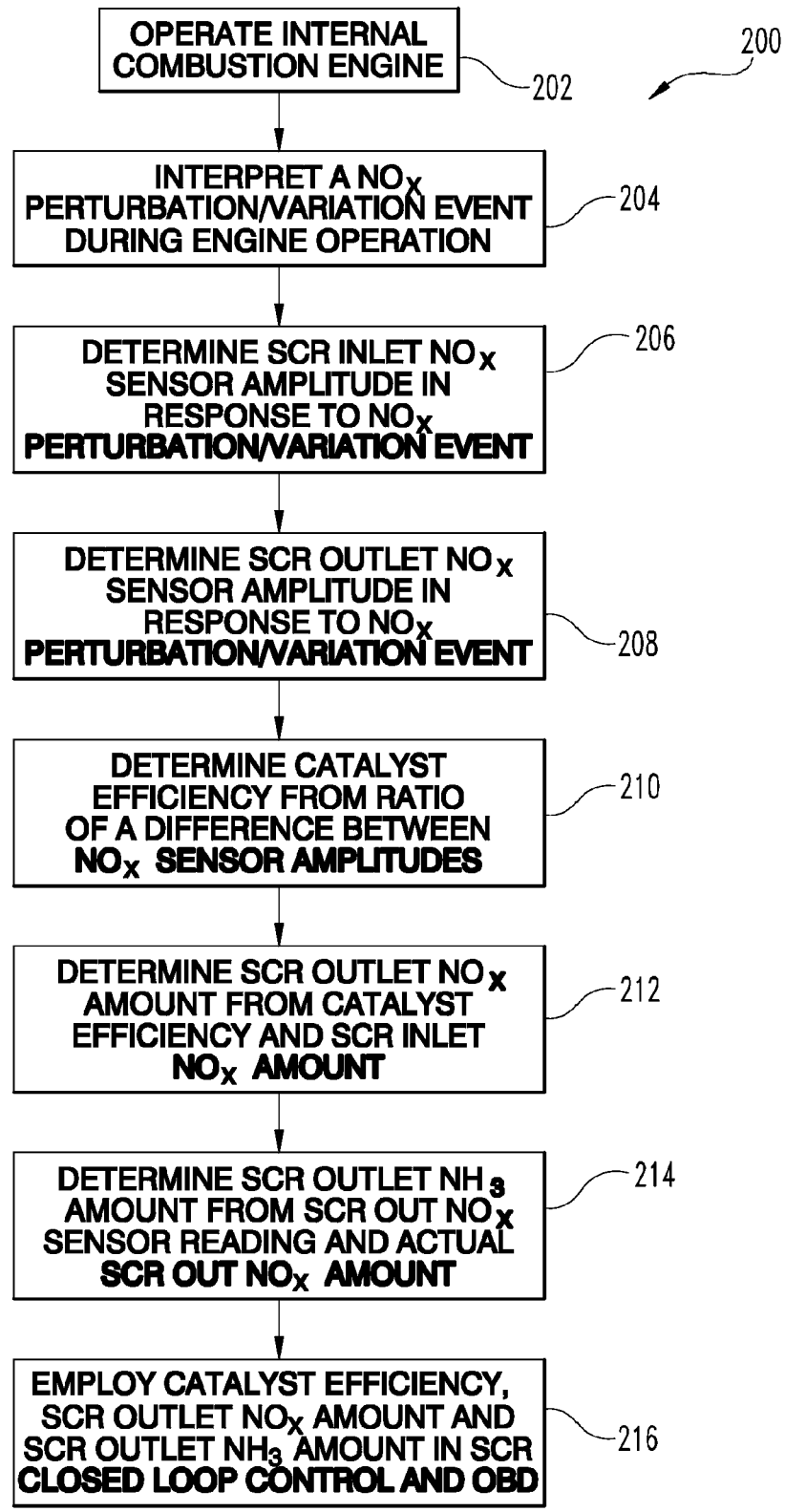
FIG. 3 is a flow diagram of a procedure for decoupling NH3 and NOx amounts from a NOx sensor output downstream of an SCR catalyst.
Figure 4:
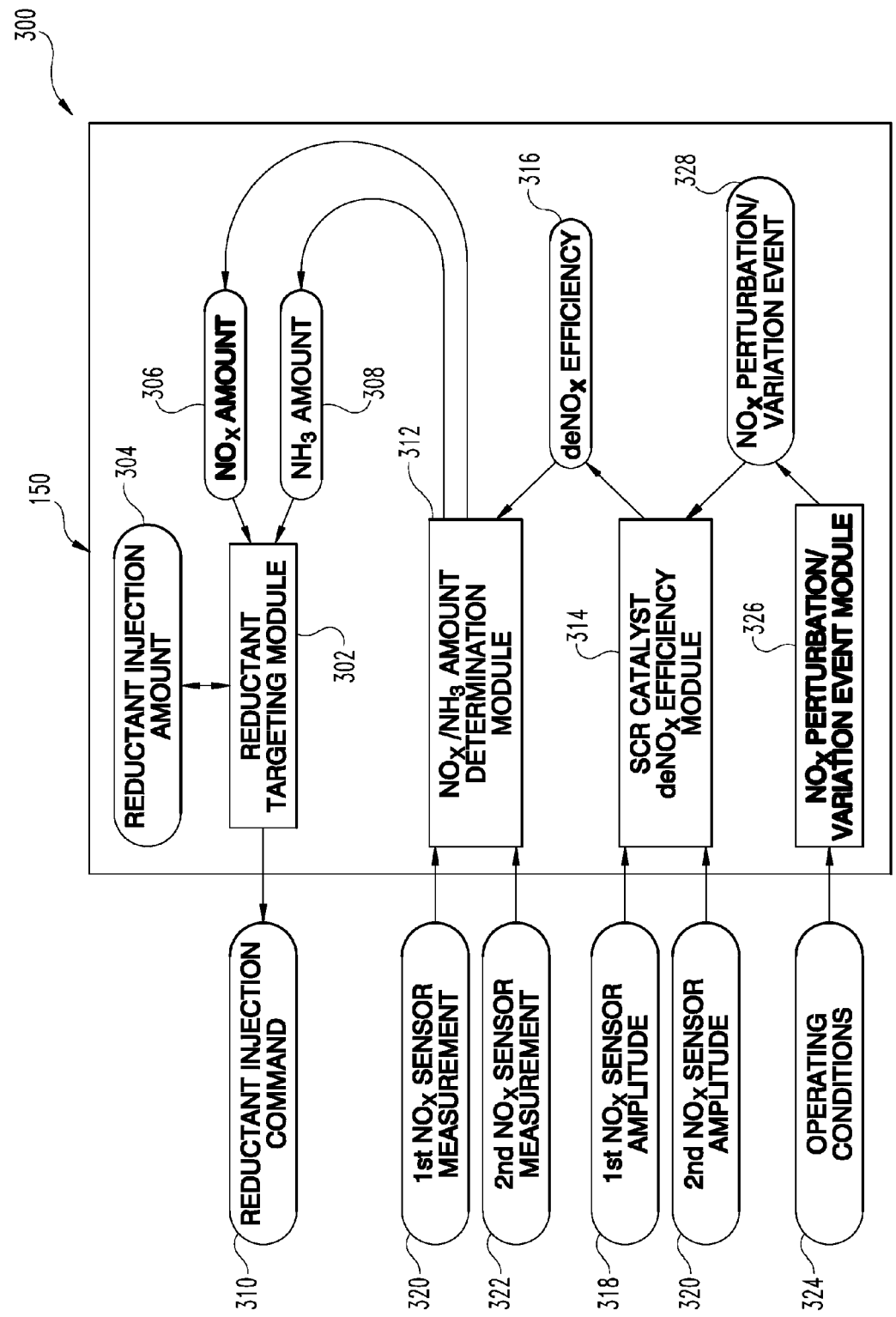
FIG. 4 is a schematic diagram of one embodiment of a controller apparatus operable to reduce NOx emissions in the exhaust gas flow of the system of FIG. 1.

Referring to FIG. 3, an exemplary procedure 200 includes providing the SCR catalyst 24 disposed in an exhaust gas system of an internal combustion engine 14, and a reductant injector 20 operationally coupled to the exhaust gas system at a position upstream of the SCR catalyst 24. The procedure 200 further includes providing a first NOx sensor 16 and a second NOx sensor 30 coupled to the exhaust system at a position upstream and downstream, respectively, of the SCR catalyst 24. The procedure 200 includes an operation 202 to operate the internal combustion engine 14 to produce an exhaust gas flow.

During operation of internal combustion engine 14, procedure 200 includes an operation 204 to interpret a NOx perturbation/variation event during operation of engine 14 that creates, causes, or detects a NOx pulse in the exhaust gas flow. The NOx perturbation/variation event can, for example, be caused by a start of injection event in which fueling into one or more of cylinders 32 by injector 36 is injected from fuel source 34, by an EGR reference event such as a change in EGR flow through EGR conduit 40 to the intake system 38, by an accelerator tip-in or tip-out condition, by a change in pressure in common rail 35, or by any engine operating event that creates or causes a NOx perturbation/variation resulting in a NOx pulse that is able to be sensed by NOx sensors 16, 30 at operations 206, 208.

At operation 206, the amplitude of the impulse of first NOx sensor 16 is determined in response to the NOx perturbation/variation event. At operation 208, the amplitude of the impulse of second NOx sensor 30 is determined in response to the NOx perturbation/variation event. By observation of the amplitude of the pulses of NOx sensors 16, 20, procedure 200 decouples the NH3 measurement from the output of the downstream NOx sensor 30. Procedure 200 continues at operation 210 to determine a de-NOx efficiency of the SCR catalyst 24 as a function of an output of the first NOx sensor 16 and an output of the second NOx sensor 30 in response to a NOx perturbation/variation event causing a NOx pulse by the engine 14 into the exhaust system. In one embodiment, the efficiency of SCR catalyst is determined by a ratio of the difference between the amplitudes of the impulses of the first and second NOx sensors 16, 30 divided by the amplitude of the impulse of first NOx sensor 16.

Procedure 200 continues at operation 212 to determine an estimate of the actual SCR outlet NOx amount from the de-NOx efficiency of SCR catalyst 24 and a NOx amount measured by the first NOx sensor 16. Thus, the NOx amount downstream of SCR catalyst 24 can be determined by only referencing the amplitude of the impulse of NOx sensor 30 in response to the NOx perturbation/variation event, without further reference to outputs of the second NOx sensor 30 that may be influenced by NH3 slip. Procedure 200 continues at operation 214 to determine an estimate of the NH3 amount downstream of the SCR catalyst 24, which can be calculated from the output of the second NOx sensor 30, the NOx amount determined to be present downstream of the SCR catalyst 24 at operation 212, and a cross-sensitivity factor of NOx sensor 30 to ammonia.

The procedure 200 further includes an operation 216 to employ the catalyst efficiency determined at operation 210, the SCR outlet NOx amount determined at operation 212, and the SCR outlet NH3 amount determined at operation 214, in closed loop control and on-board diagnostic (OBD) operation of the SCR and reductant injection system. The systems and method can include controller 28 configured to provide a reductant injection command in response to the SCR catalyst outlet NH3 amount and/or SCR catalyst outlet NOx amount determined above. The provided reductant injection command may be a reductant injection amount that is found to control the NOx measurement of NOx sensor 30. Alternatively or additionally, the provided reductant command can be offset for the NH3 amount to reduce or mitigate NH3 slip. The system and method further include injecting an amount of the reductant in response to the reductant injection command. The method further includes providing a reductant injection command in response to the estimated deNOx efficiency, calculated SCR outlet NOx amount and the calculated SCR outlet NH3 amount to control a subsequent NOx amount and the NH3 amount, and injecting an amount of the reductant in response to the reductant injection command.

An example system includes a processing subsystem having controller 28 structured to functionally execute certain operations to control an SCR aftertreatment system. In certain embodiments, the controller 28 includes one or more modules structured to functionally execute the operations of the controller 28. The description herein including modules emphasizes the structural independence of the aspects of the controller, and illustrates one grouping of operations and responsibilities of the controller. Other groupings that execute similar overall operations are understood within the scope of the present application. Modules may be implemented in hardware and/or via computer readable medium, and modules may be distributed across various hardware components.

The controller 28 may be a part of a system 300 including an SCR portion and first and second NOx sensors operationally coupled to an internal combustion engine exhaust gas flow at respective upstream and downstream positions of the SCR portion. The SCR portion includes any fraction of an SCR catalyst amount in the system, including the full SCR catalyst amount. The NOx sensors provide an output indicative of a NOx measurement, which may be an output value of the NOx sensor, a measurement of NOx in the exhaust stream, and/or an apparent measurement of NOx, for example combined with any apparent NOx due to cross-sensitivity to and the presence of ammonia in the exhaust stream at the NOx sensor.

The controller 28 may further include a reductant targeting module 302 that determines a reductant injection amount 304 in response to the actual SCR outlet NOx amount 306 and actual SCR outlet NH3 amount 308. Example and non-limiting reductant injection amounts include an ammonia to NOx ratio (ANR) target, an ANR offset to account for NH3 slip, and/or an ANR corresponding to a NOx minimum value at NOx sensor 30. Controller 28 outputs a reductant injection command 310 to reductant injector 20 that provides the reductant injection amount.

The system further includes reductant injector 20 responsive to the reductant injection command 310 output by controller 28. The reductant injector response to the reductant injection command may be any type of response understood in the art. Example and non-limiting responses of the reductant injector to the reductant injector command 310 include targeting the reductant injection amount 304 as an injection amount, progressing toward injecting the reductant injection amount 304 (e.g. through a feedforward and/or feedback controller), and/or providing the reductant injection amount 304 into a controller accepting other competing or limiting values for injection (e.g. ammonia slip limits, SCR catalyst storage limits, current conversion efficiency limits, etc.).

The controller 28 may also include a SCR catalyst deNOx efficiency module 314 configured to determine the deNOx efficiency 316 of catalyst 24 as a function of the amplitudes 318, 320 of the impulses of the first and second NOx sensors 16, 30 in response to a NOx perturbation/variation event 328. The NOx perturbation/variation event 328 can be determined from a NOx perturbation/variation event module 326 that interprets operating conditions 324 associated with operation of system 10 that indicate a NOx pulse occurrence suitable for causing amplitudes 318, 320 from the impulses of NOx sensors 16, 30 to determine deNOx efficiency 316 of catalyst 24.

The controller 28 may also include a NOx/NH3 amount determination module 312 configured to determine an estimate of the actual SCR outlet NOx amount 306 as a function of the NOx measurement 320 of the first NOx sensor 16 upstream of SCR catalyst 24 and the deNOx efficiency 316 determined from the NOx sensor impulse amplitudes 318, 320. The NOx/NH3 amount determination module 312 may also be configured to determine an estimate of the actual NH3 amount 308 as a function of the output or NOx measurement 322 of the second NOx sensor 30, the actual SCR outlet NOx amount 306, and a cross-sensitivity factor of the second NOx sensor 30 to ammonia.

According to one aspect, a method includes operating an internal combustion engine to produce an exhaust gas flow into an exhaust system including a selective catalytic reduction (SCR) catalyst disposed in the exhaust gas flow. The exhaust system includes a reductant injector coupled to the exhaust system at a position upstream of the SCR catalyst, a first NOx sensor coupled to the exhaust system at a position upstream of the SCR catalyst, and a second NOx sensor coupled to the exhaust system at a position downstream of the SCR catalyst. The method includes, in response to a NOx perturbation/variation event in the exhaust gas flow associated with operation of the internal combustion engine, determining a first output of the first NOx sensor and a second output of the second NOx sensor; determining an efficiency of the SCR catalyst in removing NOx from the exhaust gas flow as a function of the first output and the second output; determining at least one of a NOx amount downstream of the SCR catalyst and a NH3 amount downstream of the SCR catalyst as a function of a NOx amount measured by the first NOx sensor and the efficiency of the SCR catalyst determined as the function of the first output and the second output; determining a reductant injection command in response to the at least one of the NOx amount and the NH3 amount; and injecting an amount of the reductant in response to the reductant injection command.

In one embodiment of the method, the first output is an amplitude of an impulse of the first NOx sensor in response to the NOx perturbation/variation event and the second output is an amplitude of an impulse of the second NOx sensor in response to the NOx perturbation/variation event. In a refinement of this embodiment, the efficiency of the SCR catalyst is determined by: $\eta_{SCR}=(C_{NOx,imp,in}-C_{NOx,imp,out})/C_{NOx,imp,in}$; where $\eta_{SCR}$ is the efficiency of the SCR catalyst, $C_{NOx,imp,in}$ is the amplitude of the impulse of the first NOx sensor, and $C_{NOx,imp,out}$ is the amplitude of the impulse of the second NOx sensor. In a further refinement of this embodiment, the NOx amount downstream of the SCR catalyst is determined by $C_{NOx,out}=C_{NOx,in}*(1-\eta_{SCR})$; where $C_{NOx,out}$ is the NOx amount downstream of the SCR catalyst and $C_{NOx,in}$ is the NOx amount measured by the first NOx sensor. In another refinement, the NH3 amount is determined by $C_{NH3,out}=(C_{NOx,Sen,out}-C_{NOx,out})/k$; where $C_{NH3,out}$ is the NH3 amount downstream of the SCR catalyst, $C_{NOx,Sen,out}$ is an output of the second NOx sensor, and k is a cross-sensitivity factor of the second NOx sensor with ammonia.

In a further embodiment, the NOx perturbation/variation event includes a start of injection event associated with injection of a fuel into at least one cylinder of the internal combustion engine. In another embodiment, the NOx perturbation/variation event includes a change in an exhaust gas recirculation flow to an intake of the internal combustion engine. In yet another embodiment, the NOx perturbation/variation event includes a tip-in or tip-out of an accelerator providing a fueling request for the internal combustion engine. In still another embodiment, the method also includes determining an NH3 slip condition is present in response to the NH3 amount.

In another aspect, a system is disclosed that includes an internal combustion engine operable to produce an exhaust gas flow into an exhaust system. The exhaust system includes a SCR catalyst disposed in the exhaust gas flow, a reductant injector operationally coupled to the exhaust gas flow at a position upstream of the SCR catalyst, a first NOx sensor coupled to the exhaust system at a position upstream of the SCR catalyst, and a second NOx sensor coupled to the exhaust system at a position downstream of the SCR catalyst. The system also includes a controller connected to the first NOx sensor, the second NOx sensor and the internal combustion engine. The controller is configured to determine a first output of the first NOx sensor and a second output of the second NOx sensor in response to a NOx perturbation/variation event in the exhaust gas flow associated with operation of the internal combustion engine. The controller is also configured to determine an efficiency of the SCR catalyst in removing NOx from the exhaust flow as a function of the first output and the second output.

In one embodiment, the controller is configured to determine at least one of a NOx amount downstream of the SCR catalyst and a NH3 amount downstream of the SCR catalyst as a function of a NOx amount measured by the first NOx sensor and the efficiency of the SCR catalyst determined as the function of the first output and the second output. In a refinement of this embodiment, the controller is configured to determine a reductant injection command in response to the at least one of the NOx amount and the NH3 amount and control the reductant injector to inject an amount of the reductant in response to the reductant injection command.

In another embodiment, the internal combustion engine further includes an EGR conduit connecting the exhaust system to an intake system of the internal combustion event, and the controller is configured to interpret the NOx perturbation/variation event in response to a change in the exhaust gas flow from the exhaust system to the intake system through the EGR conduit.

In yet another embodiment, the internal combustion engine further includes a fueling system connected to provide fueling to a plurality of cylinders of the internal combustion event, and the controller is configured to interpret the NOx perturbation/variation event in response to start of injection of fuel into at least one of the plurality of cylinders.

In another embodiment, the system includes at least one of an oxidation catalyst and a particulate filter upstream of the SCR catalyst. In yet another embodiment, the first output is an amplitude of an impulse of the first NOx sensor in response to the NOx perturbation/variation event and the second output is an amplitude of an impulse of the second NOx sensor in response to the NOx perturbation/variation event.

According to another aspect, an apparatus includes a controller connected to a first NOx sensor upstream of a SCR catalyst in an exhaust system and a second NOx sensor downstream of the SCR catalyst. The exhaust system receives an exhaust gas flow produced by operation of an internal combustion engine. The controller includes a NOx perturbation/variation module configured to interpret a NOx perturbation/variation event in the exhaust gas flow; an SCR catalyst deNOx efficiency module configured to determine a deNOx efficiency of the SCR catalyst as a function of an output of the first NOx sensor and the second NOx sensor in response to the NOx perturbation/variation event; a NOx/NH3 amount determination module configured to determine a NOx amount downstream of the SCR catalyst in response to the deNOx efficiency and a NOx measurement of the first NOx sensor; and a reductant targeting module configured to determine a reductant injection amount in response to the NOx amount downstream of the SCR catalyst.

In one embodiment, the NOx/NH3 amount determination module is configured to determine an NH3 amount downstream of the SCR catalyst in response to a NOx measurement of the second NOx sensor, the NOx amount downstream of the SCR catalyst, and a cross-sensitivity factor of the second NOx sensor to ammonia. In another embodiment, the SCR catalyst deNOx efficiency module is configured to determine the deNOx efficiency from a ratio that is a function of an amplitude of an impulse of the first NOx sensor in response to the NOx perturbation/variation event and an amplitude of an impulse of the second NOx sensor in response to the NOx perturbation/variation event. In yet another embodiment, the reductant targeting module is configured to provide a reductant injection command that provides the reductant injection amount to the exhaust system upstream of the SCR catalyst.

While the invention has been illustrated and described in detail in the drawings and foregoing description, the same is to be considered as illustrative and not restrictive in character, it being understood that only certain exemplary embodiments have been shown and described. Those skilled in the art will appreciate that many modifications are possible in the example embodiments without materially departing from this invention. Accordingly, all such modifications are intended to be included within the scope of this disclosure as defined in the following claims.

In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

What is claimed is:

1. A method, comprising:
receiving into an exhaust system including a selective catalytic reduction (SCR) catalyst an exhaust gas flow, the exhaust system including:
a reductant injector coupled to the exhaust system at a position upstream of the SCR catalyst;
a first NOx sensor upstream of the SCR catalyst;
a second NOx sensor coupled to the exhaust system at a position downstream of the SCR, catalyst;
in response to a NOx perturbation/variation event in the exhaust gas flow, determining a first output of the first NOx sensor and a second output of the second NOx sensor, wherein the first output is an amplitude of an impulse of the first NOx sensor in response to the NOx perturbation/variation event and the second output is an amplitude of an impulse of the second NOx sensor in response to the NOx perturbation/variation event;
determining an efficiency of the SCR catalyst in removing NOx from the exhaust gas flow as a function of the first output and the second output, wherein the efficiency of the SCR catalyst is determined by:

$$\eta_{SCR}=(C_{NOx,imp,in}-C_{NOx,imp,out})/C_{NOx,imp,in};$$

wherein $\eta_{SCR}$ is the efficiency of the SCR catalyst, $C_{NOx,imp,in}$ is the amplitude of the impulse/variation of the first NOx sensor, and $C_{NOx,imp,out}$ is the amplitude of the impulse/variation of the second NOx sensor;
determining at least one of a NOx amount downstream of the SCR catalyst and a NH3 amount downstream of the SCR catalyst as a function of a NOx amount measured by the first NOx sensor and the efficiency of the SCR catalyst determined as the function of the first output and the second output;
determining a reductant injection command in response to the at least one of the NOx amount and the NH3 amount; and injecting an amount of the reductant in response to the reductant injection command.

2. The method of claim 1, wherein the NOx amount downstream of the SCR catalyst is determined by:

$$C_{NOx,out} = C_{NOx,in} * (1-\eta_{SCR});$$

wherein $C_{NOx,out}$ is the NOx amount downstream of the SCR catalyst and $C_{NOx,in}$ is the NOx amount measured by the first NOx sensor.

3. The method of claim 1, wherein the NH3 amount is determined by:

$$C_{NH3,out} = (C_{NOx,Sen,out} - C_{NOx,out})/k;$$

wherein $C_{NH3,out}$ is the NH3 amount downstream of the SCR catalyst, $C_{NOx,Sen,out}$ is an output of the second NOx sensor, and k is a cross-sensitivity factor of the second NOx sensor with ammonia.

4. The method of claim 1, wherein the NOx perturbation/variation event includes a start of injection event associated with injection of a fuel into at least one cylinder of an internal combustion engine.

5. The method of claim 1, wherein the NOx perturbation/variation event includes at least one of a change in an exhaust gas recirculation flow to an intake of an internal combustion engine, a change in rail pressure of a common fuel rail of the internal combustion engine, and a start of injection into a cylinder of the internal combustion engine.

6. The method of claim 1, wherein the NOx perturbation/variation event includes at least one of as tip-in or tip-out of an accelerator providing a fueling request for an internal combustion engine.

7. The method of claim 1, further comprising determining an NH3 slip condition is present in response to the NH3 amount.

8. A system, comprising:
an exhaust system including:
a selective catalytic reduction (SCR) catalyst operable to receive an exhaust gas flow;
a reductant injector operationally coupled to the exhaust gas flow at a position upstream of the SCR catalyst;
a first NOx sensor upstream of the SCR catalyst;
a second NOx sensor coupled to the exhaust system at a position downstream of the SCR catalyst; and
a controller connected to the first NOx sensor and the second NOx sensor, the controller being configured to determine a first output of the first NOx sensor and a second output of the second NOx sensor in response to a NOx perturbation/variation event in the exhaust gas flow, the controller further being configured to determine an efficiency of the SCR catalyst in removing NOx from the exhaust flow as a function of the first output and the second output, wherein the first output is an amplitude of an impulse/variation of the first NOx sensor in response to the NOx perturbation event and the second output is an amplitude of an impulse/variation of the second NOx sensor in response to the NOx perturbation/variation event, and the efficiency of the SCR catalyst is determined by:

$$\eta_{SCR} = (C_{NOx,imp,in} - C_{NOx,imp,out})/C_{NOx,imp,in};$$

wherein $\eta_{SCR}$ is the efficiency of the SCR catalyst, $C_{NOx,imp,out}$ is the amplitude of the impulse/variation of the first NOx sensor, and $C_{NOx,imp,out}$ is the amplitude of the impulse/variation of the second NOx sensor wherein the controller is configured to determine a reductant injection command in response to the efficiency of the SCR catalyst and control the reductant injector to inject an amount of the reductant in response to the reductant injection command.

9. The system of claim 8, wherein the controller is configured to determine at least one of a NOx amount downstream of the SCR catalyst and a NH3 amount downstream of the SCR catalyst as a function of a NOx amount measured by the first NOx sensor and the efficiency of the SCR catalyst determined as the function of the first output and the second output.

10. The system of claim 9, wherein the controller is further configured to determine the reductant injection command in response to the at least one of the NOx amount and the NH3 amount.

11. The system of claim 8, further comprising an internal combustion engine, wherein the internal combustion engine further includes an exhaust gas recirculation (EGR) conduit connecting the exhaust system to an intake system of the internal combustion event, and the controller is configured to interpret the NOx perturbation/variation event in response to a change in the exhaust gas flow from the exhaust system to the intake system through the EGR conduit.

12. The system of claim 8, further comprising an internal combustion engine, wherein the internal combustion engine further includes a fueling system connected to provide fueling to a plurality of cylinders of the internal combustion event, and the controller is configured to interpret the NOx perturbation/variation event in response to at least one of start of injection of fuel into at least one of the plurality of cylinders and a change in rail pressure of a common fuel rail of the internal combustion engine.

13. The system of claim 8, further comprising at least one of an oxidation catalyst and a particulate filter upstream of the SCR catalyst.

14. An apparatus for controlling a reductant injector, the apparatus comprising:
a controller connected to a first NOx sensor upstream of a selective catalytic reduction (SCR) catalyst in an exhaust system and a second NOx sensor downstream of the SCR catalyst, wherein the exhaust system receives an exhaust gas flow produced by operation of an internal combustion engine, the controller including:
a NOx perturbation/variation module configured to interpret a NOx perturbation/variation event in the exhaust gas flow;
an SCR catalyst deNOx efficiency module configured to determine a deNOx efficiency of the SCR catalyst as a function of an output of the first NOx sensor and the second NOx sensor in response to the NOx perturbation/variation event, wherein the SCR catalyst deNOx efficiency module is configured to determine the deNOx efficiency from a ratio that is a function of an amplitude of an impulse/variation of the first NOx sensor in response to the NOx perturbation event and an amplitude of an impulse/variation of the second NOx sensox in response to the NOx perturbation event, the ratio being:

$$\eta_{SCR} = (C_{NOx,imp,in} - C_{NOx,imp,out})/C_{NOx,imp,in};$$

wherein $\eta_{SCR}$ is the deNOx efficiency of the SCR catalyst, $C_{NOx,imp,in}$ is the amplitude of the impulse/variation of the first NOx sensor, and $C_{NOx,imp,out}$ is the amplitude of the impulse/variation of the second NOx sensor;

a NOx/NH3 amount determination module configured to determine a NOx amount downstream of the SCR catalyst in response to the deNOx efficiency and a NOx measurement of the first NOx sensor; and a reductant targeting module configured to control the reductant injector to inject a reductant injection amount to the exhaust system in response to the NOx amount downstream of the SCR catalyst.

15. The apparatus of claim 14, wherein the NOx/NH3 amount determination module is configured to determine an NH3 amount downstream of the SCR catalyst in response to a NOx measurement of the second NOx sensor, the NOx amount downstream of the SCR catalyst, and a cross-sensitivity factor of the second NOx sensor to ammonia.

* * * * *